United States Patent [19]
King

[11] Patent Number: 5,297,825
[45] Date of Patent: Mar. 29, 1994

[54] POLE SPLICING JOINT

[75] Inventor: Gary P. King, Richfield, Minn.

[73] Assignee: Lexington Standard Corporation, St. Paul, Minn.

[21] Appl. No.: 922,062

[22] Filed: Jul. 29, 1992

Related U.S. Application Data

[62] Division of Ser. No. 669,481, Mar. 14, 1991, Pat. No. 5,138,760.

[51] Int. Cl.$^5$ ............... F16L 25/00; F16L 35/00
[52] U.S. Cl. .................... 285/331; 29/525; 285/369
[58] Field of Search ............. 29/897.33, 235, 505, 29/525; 285/331, 332.4, 374, 369, 399, 397, 417

[56] References Cited

U.S. PATENT DOCUMENTS

| | | | |
|---|---|---|---|
| Re. 9,145 | 4/1880 | Bacon | 285/332.4 |
| 214,545 | 4/1879 | Bacon | 285/399 |
| 1,011,363 | 12/1911 | Parry | 285/399 X |
| 1,545,036 | 7/1925 | Culhane, Jr. et al. | 285/399 X |
| 2,712,950 | 7/1955 | Siebert | 285/399 X |
| 2,795,440 | 6/1957 | Holycross et al. | 285/332.4 X |
| 4,523,780 | 6/1985 | Cheer | 285/399 |
| 5,138,760 | 8/1992 | King | 29/525 |

Primary Examiner—Timothy V. Eley
Attorney, Agent, or Firm—John W. Adams

[57] ABSTRACT

This invention is a pole splicing joint construction and method of making the same and consists in initially preparing the upper end portion of the lower pole section to produce a splicing section having an abutment shoulder for the lower end of the upper section. This abutment shoulder is formed at the bottom of the splicing section of the lower pole section which has an outer abutment ring surface lying in a plane oriented substantially normal to the axis of the lower tube section.

4 Claims, 1 Drawing Sheet

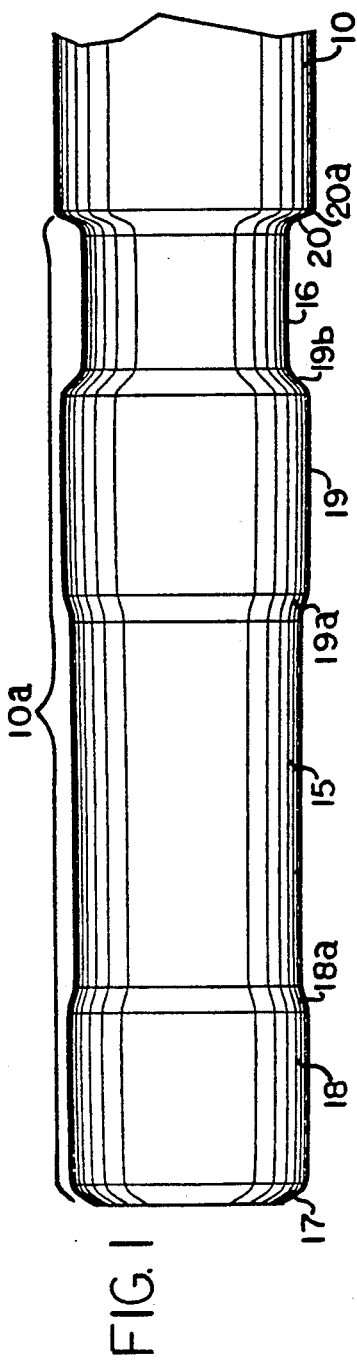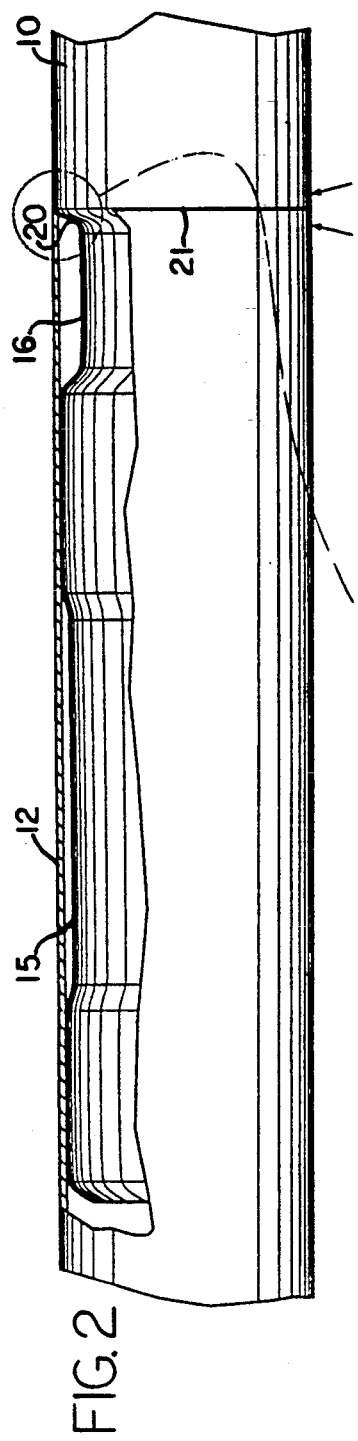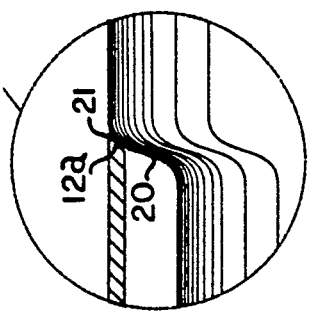

POLE SPLICING JOINT

This Application is a divisional application of applicant's original U.S. patent application, Ser. No. 07/669,481, filed Mar. 14, 1991 and is directed to the apparatus claims which were deleted from the prosecution of the parent application in view of applicant's election to prosecute the method claims in the original application under examiner's requirement for election therein. The original application has been formally allowed and will issue on Aug. 17, 1992, U.S. Pat. No. 5,138,760.

BACKGROUND OF THE INVENTION

For years, it has been a problem to ship long poles such as flagpoles and light poles for highway lights. For this reason, these poles have been cut into two sections. The poles are of tapered design, and this accentuates the problem of splicing the two sections together. The problem is not only one of positively splicing the poles together with sufficient strength to withstand the stresses produced by high winds but is also an appearance problem. The poles are usually made of aluminum and are frequently anodized, which requires uniformity of chemical composition to produce a uniform color coating. The industry has worked continuously for more than thirty years to develop a connection joint which will be substantially invisible when completed.

PRIOR ART

A present method for producing this joint includes the use of a splicing sleeve which is partially inserted into the upper end portion of the bottom section and is securely anchored therein by the use of a pair of cross pins welded in place. A portion of the sleeve extends outwardly from the end of the section for insertion into the upper section to be joined. The connection between the exposed portion of the splicing sleeve and the upper pole section must be made in the field. This requires preparing the upper section by trimming the lower end, which reduces the diameter of the connecting portion because of the tapered configuration and insures a positive fixed connection with the exposed end of the splicing sleeve when the final splice is made in the field by forcing the bottom of the upper section onto the sleeve until the ends of the two pole sections are abutted to produce the desired hair line joint. In order to insure that the two abutted ends of the two pole sections are in precise registration. The cut-off ends are indexed by embossing an index line so that any cutting irregularities in the cut-off edges will be matched and the mating abutted edges of the two sections will produce a tight hair line butt joint when joined together.

Obviously, this method of splicing the two ends together is expensive and difficult to produce and has the inherent problem of producing the exposed weld at the ends of the connecting cross pins which are clearly visible even after surface finishing, because the composition of the weld material is different from the composition of the pole and produces a different color when the finished outside surface coating is applied as by an anodizing process or by applying some alternative permanent coating process.

Another prior art joint system that has been developed in an effort to overcome the problem includes reducing the tapered diameter of the upper end of the lower pole section to produce a tapered lower reduced joint section which is telescopically received into the lower end of the upper section. This joint system includes the user of a tapered outside collar, the taper of which conforms to the slope of the tapered lower joint section formed at the upper end of the lower tube section. This collar is designed to produce two knife edge joints, one at the lower thin edge thereof and the other at the upper thicker edge thereof. The thicker edge abuts the lower end of the upper pole section when the same is received on the reduced joint section of the lower pole section. This is an expensive joint to produce and has two knife edge joints which are visible. It also introduces a splicing collar which of necessity is made from a material which is a different composition than the material of the pole sections and is difficult if not impossible to match during the final surface finishing of the pole sections.

SUMMARY OF THE INVENTION

The concept of the present invention includes joining the two pole sections together by reducing the diameter of the upper end portion of the lower section. This provides a splicing section which can be received telescopically into the upper end of the lower pole section. A deep drawn groove is formed at the lower end of the splicing section of the bottom pole section. This groove reduces the diameter of the larger tube section substantially more than the wall thickness of the tube, so that the outer circumferential edge of the deep drawn lower groove wall will abut the lower circumferential edge of the upper tube when it is received on the splicing section. This will produce the desired substantially invisible knife edge joint between the two sections without requiring the use of any non-compatible materials such as a joint collar or welded connecting pins. The present invention provides a sharp taper at the lower end wall of the circumferential recess formed at the bottom of the splicing section in the lower section. The dept of the groove is sufficient to draw the wall material down into an abutment surface which will approach an angular relationship generally normal to the axis of the tube. The lower splicing end of the upper tube section is bevelled to abut the circumferential end wall surface of the groove and produce the desired knife edge joint required for the desired aesthetic appearance.

DESCRIPTION OF THE DRAWINGS

FIG. 1 is a elevational view showing the splicing section of the upper end of the lower pole section;

FIG. 2 is an elevational view of the two pole sections joined together and having portions broken away; and, FIG. 3 is an enlarged view of the finished joint.

DETAILED DESCRIPTION OF THE PREFERRED EMBODIMENT

The present invention permits the direct connection between two sections of an elongated tubular pole unit.

As shown in the accompanying drawings, two tapered sections 10 and 12 are initially provided in lengths of less than 40 feet. This facilitates shipping and eliminates the heavy penalty charge for shipping pieces longer than 40 feet, but as previously stated requires a splice to be made in the field to connect the two sections.

The lower is section designated as an entirety by the numeral 10 and is initially prepared to receive telescopically the lower end of the upper section 12. This preparation of the lower section includes the reduction in diameter of a splicing section 10a and thereafter reducing the diameter of spaced apart recess portions 15 and 16 which divide the splicing section 10a into two spaced apart supporting sections 18 and 19. These reduced sections 15 and 16 are produced by a tapering tool which is a free wheeling tapering roller forcibly engaged against the outer circumferential surface of the tubular area to be reduced. Opposing back-up force is provided by a tube-surrounding bearing collar in a conventional manner.

The lower end 20 of the lower reduced section 16 is more sharply bevelled than other beveled portions 18a, 19a, and 19b produced at the ends of the spaced recess portions 15 and 16. This provides an annular abutment shoulder 20 for engagement with the lower end 12a of the upper pole section 12 as best shown in FIG. 3. This produces a clean tight splice line 21 which forms the desired knife edge appearance without the use of any additional splicing parts or different materials.

The upper section 12 is prepared for the final field assembly operation by cutting off a portion at the lower end thereof.

It will be seen that this invention provides a relatively simple yet very effective joint construction for long tubular poles. This is accomplished by preparing a splicing section at the upper end of the lower pole section which includes an abutment shoulder for receiving in close fitting relationship the lower circumferential edge of the upper pole section. Satisfactory results are obtained by providing an abutment shoulder 20 having a radius of curvature of less than ⅜th inch, and the best results being obtained when this radius of curvature is reduced to ¼th inch. This reduced radius of curvature is produced by drawing the material of the shoulder 20 downwardly a sufficient distance to produce the desired radius of curvature. It will also be noted that the stability of the joint construction is also provided by the spaced apart supporting sections 18 and 19 which are telescopically received within the lower portion of the upper section and frictionally engage the inner surface of the upper section.

It will, of course, be understood that various changes may be made in the form, details, and proportions of the parts embodying this invention without departing from the scope thereof as defined in the appended claims.

What is claimed is:

1. A tapered pole splicing joint system for large diameter poles which are in excess of 40 feet long when assembled, said system comprising:
    a lower pole section having a top and bottom with a larger end at the bottom to form a base and a smaller end at the top thereof,
    an upper pole section,
    a reduced diameter splicing section at the top of the lower pole section with an upper end and a lower end and forming a sharply curved abutment shoulder at the lower end of the splicing section for positive mating engagement with the lower end of the upper pole section when joined therewith, and having the same mating outside diameter as the lower end of the upper section, and
    the upper pole section having a lower circumferential end beveled to conform to the sharply curved abutment shoulder and mate therewith to produce a positive substantially invisible circumferential abutment joint between the two joined together sections.

2. The structure set forth in claim 1 and a recess formed radially inwardly of the shoulder and lying in an annular plane substantially normal to the axis of the pole, thus producing a sharply curved abutment shoulder surface adjacent the outer circumferential portion at the lower end of the splicing section for abutment with the lower beveled end of the upper section when assembled.

3. The structure set forth in claim 2 wherein the radius of the curved abutment shoulder surface is less than ⅜th inch.

4. The structure set forth in claim 3 wherein radius of said shoulder is approximately ¼th inch.

* * * * *